Patented Apr. 14, 1953

2,635,112

UNITED STATES PATENT OFFICE 2,635,112

PROCESS FOR PRODUCING AMINOMETHYL-PHOSPHONIC ACID COMPOUNDS

Ellis Kirby Fields, Chicago, Ill., assignor to Research Corporation, New York, N. Y., a corporation of New York No Drawing. Application July 28, 1949,
Serial No. 107,380

9 Claims. (Cl. 260—461)

This invention relates to novel organic phosphorus compounds and to methods for making the same. More particularly the invention deals with the preparation of N-substituted aminomethyl phosphonic acid compounds and C-substituted derivatives thereof.

It is an object of this invention to produce novel organic compounds which are characterized by possessing in their molecule both a substituted amino group and a phosphonic acid group.

The novel compounds of this invention have the general formula

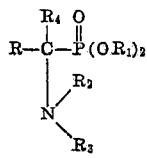

wherein R, $R_1$, $R_2$, $R_3$, and $R_4$ may be the same or different organic radicals such as alkyl, aryl, aralkyl, cycloalkyl and heterocyclic radicals, as well as such radicals containing substituents such as halogen, nitro, amino and substituted amino, hydroxy, alkoxy, mercapto, carbonyl, carboxy, thiocyano, and the like; in addition, R, $R_3$, and $R_4$ may be hydrogen atoms and $R_1$ may be hydrogen or salt-forming cations. Further details concerning the various groups and specific illustrations thereof are given below.

I have discovered that these novel compounds may be prepared in excellent yields by causing to react together an aldehyde or ketone (hereafter referred to as carbonyl compound), a primary or secondary amine, and a di-ester of phosphorous acid such as diethyl phosphite (hereafter referred to as phosphite diester). The reaction of formaldehyde, diethylamine, and diethyl phosphite to give diethylaminomethylphosphonic acid diethyl ester as illustrated in the following equation is typical of the method of the invention:

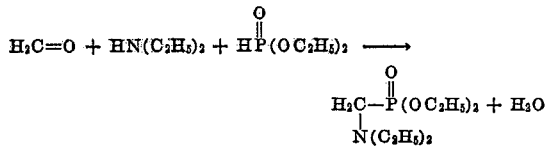

The reaction may proceed through the intermediate of an alkylolamine which reacts with the phosphite diester:

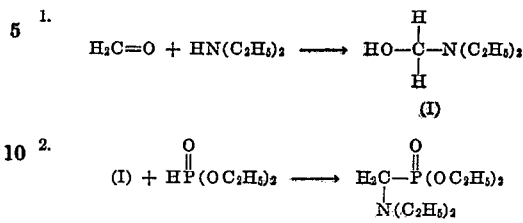

I have found that Reaction 2 takes place by preparing pure alkylol amines such as methyloldiethylamine and reacting them with phosphite diesters to obtain good yields of substituted aminomethylphosphonic esters; this in fact constitutes an alternative general method of preparing these compounds.

Two methods have thus far been described which produce the novel compounds of the invention, namely, (a) reaction of a carbonyl compound, amine, and phosphite diester, and (b) reaction of a C- and N-substituted methylolamine with a phosphite diester. Water is formed as a product in the reaction according to either of these two methods. This is of little moment in most cases, for the reaction takes place very rapidly. In some cases the carbonyl compound reacts relatively slowly and a side reaction may occur to a considerable extent, that is, some phosphite diester may be hydrolyzed by the water as it forms. In such cases the yield of substituted aminomethylphosphonic acid diester may be significantly lowered.

I have discovered another alternative method for preparing the compounds of the invention which avoids the formation of water during the reaction. This consists of reacting a tetra-substituted alkylidenediamine with a phosphite diester, according to the equation

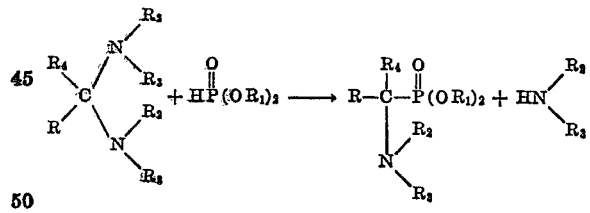

where R, R₁, R₂, R₃ and R₄ have the previously described significance. For example, tetraethylmethylenediamine reacts with diethyl phosphite when warmed to split off diethylamine and give diethylaminomethylphosphonic acid diethyl ester in almost quantitative yield:

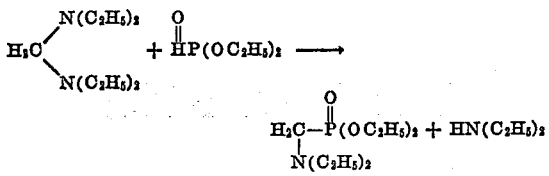

When mono-substituted amines are used in the reaction with a carbonyl compound and a phosphite diester, the yields of substituted aminomethylphosphonic esters are usually considerably less than when di-substituted amines are used. The lower yield is probably due to the fact that the mono-N-substituted aminomethylphosphonic esters are capable of reacting further with another molecule of carbonyl compound and phosphite diester.

I have discovered that compounds of general formula

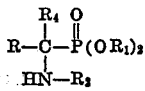

may be formed easily, rapidly and in very good yields by reacting imines of structure

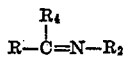

(wherein the radicals R, R₂ and R₄ have the aforementioned significance) with a phosphite diester. Thus, butyraldehydebutylimine reacts with diethyl phosphite to give a quantitative yield of alpha-butylaminobutylphosphonic acid diethyl ester:

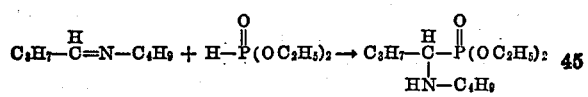

The novel phosphonic esters of this invention are in general colorless or very lightly colored liquids which may be distilled in vacuo. The lower members are very soluble in water. They possess the peculiar property of dissolving in cold water but separating out when the solution is heated. The esters are completely miscible with all the common organic solvents, ranging from ethylene glycol and glycerine to kerosene.

The new phosphonic esters are extremely stable to acids and bases. For example, diethylaminomethylphosphonic acid diethyl ester may be refluxed for 48 hours with either concentrated hydrochloric acid or 10% aqueous sodium hydroxide without undergoing any apparent hydrolysis. The esters can be hydrolyzed to the acid salts by heating with 48% hydrobromic acid or concentrated alcoholic potassium hydroxide. These hydrolyses represent novel, simple and effective methods of preparing the new substituted aminomethylphosphonic acids and their salts. The acids and their salts and esters are designated herein as a group by the term "phosphonic acid compounds."

The new phosphonic esters are also extremely resistant to the action of strong oxidizing agents. This causes some difficulty in the analysis for phosphorus, in that digestion of the phosphonic ester with a mixture of concentrated nitric and perchloric acids has to be prolonged for periods about five times as great as for ordinarly organic phosphorus compounds. Digestion of the phosphonic ester with concentrated sulfuric acid and selenium dioxide for nitrogen analysis gives little or no ammonia.

In Tables I and II are listed a number of typical compounds of the invention. It is understood that the scope of the invention is not limited to the specific compounds therein described.

TABLE I

C- and N-substituted aminomethylphosphonic esters

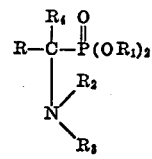

| R | R₄ | R₁ | R₂ | R₃ | Boiling Point | |
|---|---|---|---|---|---|---|
| | | | | | °C. | mm. pressure |
| H | H | ethyl | methyl | methyl | 88 | 2 |
| H | H | do | ethyl | ethyl | 95-97 | 3 |
| H | H | do | i-propyl | i-propyl | 112 | 2 |
| H | H | do | butyl | butyl | 127 | 2 |
| H | H | do | cyclohexyl | cyclohexyl | 148-150 | 2 |
| H | H | do | octyl | octyl | 174-176 | 2 |
| H | H | do | oxybisethylene a | | 137 | 3 |
| H | H | do | pentamethylene b | | 124 | 3 |
| H | H | do | ethyl | phenyl | 126 | 1 |
| H | H | do | H | butyl | 113-116 | 2.5 |
| H | H | do | H | b-phenylethyl | 100-110 | 1 |
| H | methyl | do | ethyl | ethyl | 94 | 1 |
| H | ethyl | do | do | do | 95 | 1 |
| H | propyl | do | do | do | 104-107 | 1 |
| methyl | methyl | do | do | do | 103-105 | 2.5 |
| H | a-furan | do | do | do | 140 dec. | 2 |
| H | vinyl | do | do | do | 116 | 4 |
| H | propyl | do | butyl | butyl | could not be distd. | |
| H | H | butyl | ethyl | ethyl | 131-132 | 1 | a From morpholine.
b From piperidine.

TABLE II

*Products of the reaction of imines with diethyl phosphite*

| Imine | Product | Boiling Point °C. | mm. pressure |
|---|---|---|---|
| ethylidene-ethylimine | $CH_3-CH-\overset{O}{\overset{\|}{P}}(OC_2H_5)_2$<br>$\quad\quad\overset{\|}{HN}-C_2H_5$ | 83-85 | 1 |
| isopropylidene-ethylimine | $(CH_3)_2C-\overset{O}{\overset{\|}{P}}(OC_2H_5)_2$<br>$\quad\quad\overset{\|}{HN}-C_2H_5$ | 75 | 0.5 |
| butylidene-methylimine | $C_3H_7-CH-\overset{O}{\overset{\|}{P}}(OC_2H_5)_2$<br>$\quad\quad\overset{\|}{HN}-CH_3$ | 100 | 1.5 |
| butylidene-butylimine | $C_3H_7-CH-\overset{O}{\overset{\|}{P}}(OC_2H_5)_2$<br>$\quad\quad\overset{\|}{HN}-C_4H_9$ | 110 | 1 |
| propionylidene-ethylimine | $C_2H_5-CH-\overset{O}{\overset{\|}{P}}(OC_2H_5)_2$<br>$\quad\quad\overset{\|}{HN}-C_2H_5$ | 92-94 | 1.5 |
| butylidene-methylimine with dibutyl phosphite | $C_3H_7-CH-\overset{O}{\overset{\|}{P}}(OC_4H_9)_2$<br>$\quad\quad\overset{\|}{HN}CH_3$ | 118-122 | 2 |
| benzal-aniline | $C_6H_5-CH-\overset{O}{\overset{\|}{P}}(OC_2H_5)_2$<br>$\quad\quad\overset{\|}{HN}-C_6H_5$ | 92 (melting point) | |
| benzal-p-aminophenol | $C_6H_5-CH-\overset{O}{\overset{\|}{P}}(OC_2H_5)_2$<br>$\quad\quad\overset{\|}{HN}-C_6H_4OH$ | | |
| dibenzal-ethylene-diamine | $(C_2H_5O)_2\overset{O}{\overset{\|}{P}}-\overset{C_6H_5}{\overset{\|}{CH}}\quad\overset{C_6H_5}{\overset{\|}{HC}}-\overset{O}{\overset{\|}{P}}(OC_2H_5)_2$<br>$\quad\overset{\|}{HN}-(CH_2)_2-\overset{\|}{NH}$ | | |
| butylidene-nonyl-imine | $C_3H_7-CH-\overset{O}{\overset{\|}{P}}(OC_2H_5)_2$<br>$\quad\quad\overset{\|}{HN}-C_9H_{19}$ | | |
| octadecenal-butylimine | $C_{17}H_{33}-CH-\overset{O}{\overset{\|}{P}}-(OC_2H_5)_2$<br>$\quad\quad\overset{\|}{HN}-C_4H_9$ | | |

In the following typical examples all parts are by weight.

Example I

To a cold mixture of 13.8 parts diethyl phosphite and 7.32 parts diethylamine are added 7.5 parts 40% aqueous formaldehyde. The resulting clear solution becomes hot. When it no longer evolves heat (10-15 minutes) it is distilled in vacuo. There are obtained 20.3 parts (84.2%) of diethylaminomethylphosphonic acid diethyl ester as a colorless oil boiling at 95° C. at 3 mm. pressure.

Example II

Thirteen and eight-tenths parts of diethyl phosphite are added to 10.32 parts of methyloldiethylamine. The mixture is kept below 40° C. by cooling till heat is no longer evolved, then distilled. There are obtained 23.6 parts (98%) of diethylamino methyl phosphonic acid diethyl ester boiling at 95° C. at 3 mm. pressure.

Example III

To 15.8 parts of tetra-ethylmethylenediamine are added 13.8 parts of diethyl phosphite. The solution is heated at 85° C. while 7.3 parts of diethylamine distils, then the distillation is continued in vacuo. There are obtained 20 parts (91%) of diethylaminomethylphosphonic acid diehytl ester boiling at 95° at 3 mm. pressure.

Example IV

To a cold mixture of 13.8 parts diethyl phosphite and 12.9 parts dibutylamine are added 7.5 parts 40% aqueous formaldehyde. The clear solution becomes hot. It is distilled after 10 minutes, yielding 24.8 parts (91.5%) dibutylaminomethylphosphonic acid diethyl ester boiling at 127° at 2 mm. pressure.

Example V

To a cold mixture of 13.8 parts of diethyl phosphite and 7.3 parts diethylamine are added 5.8 parts propionaldehyde. The clear solution becomes very hot. After 10 minutes it is distilled, yielding 20.3 parts (81%) of alpha-diethylaminopropylphosphonic acid diethyl ester boiling at 95° C. at 1 mm. pressure.

Example VI

A mixture of 5.8 parts acetone, 13.8 parts diethyl phosphite and 7.3 parts diethylamine is warmed under reflux at 50° C. for 20 minutes, then distilled. There is obtained 10.2 parts (40%) of alpha-diethylaminoisopropylphosphonic acid diethyl ester boiling at 103-105° C. at 1.5 mm. pressure.

Example VII

To a mixture of 7.3 parts monobutylamine and 13.8 parts diethyl phosphite are added 7.5 parts 40% aqueous formaldehyde. The hot solution is distilled after 10 minutes, yielding 8.5 parts (38%) of butylaminomethylphosphonic acid diethyl ester boiling at 113-116° C. at 2.5 mm. pressure.

Example VIII

Nine and six-tenths parts of furfural are added to 7.3 parts of diethylamine. The warm product is mixed with 13.8 parts diethyl phosphite. A quantitative yield of a dark oil insoluble in water, very soluble in acids, and decomposing to a considerable extent on attempted distillation in vacuo, is obtained. The oil is alpha-diethylamino-alpha-furylmethylphosphoric acid diethyl ester.

Example IX

To a warm mixture of 3.75 parts 40% aqueous formaldehyde and 3.65 parts diethylamine are added 9.7 parts dibutyl phosphite. The hot solution is distilled after 10 minutes, yielding 11 parts (79%) of diethylaminomethylphosphonic acid dibutyl ester boiling at 131-132° C. at 1 mm. pressure.

Example X

A solution of 5.6 parts potassium hydroxide and 11.15 parts diethylaminomethylphosphonic acid diethyl ester in 75 cc. of methanol is refluxed for 4 hours. The resulting mixture is evaporated, yielding 12.1 parts of the di-potassium salt of diethylaminomethylphosphonic acid as a light-colored hygroscopic solid.

The copper, calcium and barium salts of diethylaminomethylphosphonic acid are soluble in water.

Example XI

Six and thirty-three hundredths parts benzyl chloride and 11.15 parts diethylaminomethylphosphonic acid diethyl ester are heated together on a steam bath for 16 hours. The product is N-(methylenephosphonic acid diethyl ester)-diethylbenzylammonium chloride, a hard, transparent mass, easily soluble in water.

Example XII

Seven and one-tenth parts butyraldehyde are treated with 14.3 parts nonylamine (3,5,5-trimethylhexylamine). The product is freed from water. To 11.1 parts of the product are added 7.8 parts diethyl phosphite. The mixture is kept at 65° for 10 minutes, giving alpha-nonylaminobutylphosphonic acid diethyl ester, as a viscous, light yellow syrup. This ester is hydrolyzed by refluxing with 11.2 parts potassium hydroxide in 75 parts ethyl alcohol for 2 hours. The mixture is evaporated on the water bath to give the dipotassium salt of alpha-nonylaminobutylphosphonic acid. This salt is a syrupy, light-colored mass which dissolves very readily in water to make a clear foaming solution. The free acid is obtained as a viscous syrup by adding an equivalent amount of hydrochloric acid to the solution of the dipotassium salt. It is moderately soluble in hot excess hydrochloric acid, easily soluble in aqueous alkali and ammonia. The overall yield is practically quantitative.

Example XIII

Seven and five-tenths parts 40% aqueous formaldehyde are warmed with 35.3 parts secondary coconut amines (mostly dilaurylamine). When all has reacted, the mixture is treated with 13.8 parts diethyl phosphite and kept at 55° for 20 minutes, giving a product consisting principally of alphadilaurylaminomethylphosphonic acid diethyl ester. The ester is hydrolyzed by refluxing with 11.2 parts potassium hydroxide in 75 parts ethyl alcohol for 6 hours. The dipotassium salt, obtained by evaporating the hydrolysis mixture on the water bath, is a light-colored waxy solid, soluble in hot water and insoluble in cold water. The free acid is a waxy solid which forms slightly-soluble salts with acids and bases.

Example XIV

To a mixture of 7.1 parts butyraldehyde and 12.9 parts dibutylamine are added 13.8 parts diethyl phosphite. The mixture is warmed at 65° for 15 minutes, the water separated, and the oil, alpha-dibutylaminobutylphosphonic acid diethyl ester, is hydrolyzed by being refluxed with 11.2 parts potassium hydroxide in 75 parts ethyl alcohol for 4 hours. The dipotassium salt of alpha-dibutylaminobutylphosphonic acid is obtained as a syrupy solid by evaporating the hydrolysis mixture on the water bath. It forms clear aqueous solutions which foam mildly. The free acid is a heavy oil, moderately soluble in hydrochloric acid.

Example XV

Six parts ethylidene-ethylimine are added to 12.1 parts diethyl phosphite. The solution becomes very hot. After 10 minutes it is distilled, yielding 16.8 parts (93%) 1-ethylaminoethylphosphonic acid diethyl ester, a colorless mobile liquid boiling at 83-85° C. at 1 mm. pressure.

Example XVI

Fourteen parts isopropylidene-ethylimine are mixed with 22 parts diethyl phosphite. The mixture becomes hot. After 10 minutes it is distilled, yielding 31 parts (89%) alpha-ethylaminoisopropylphosphonic acid diethyl ester boiling at 100° C. at 1.5 mm. pressure.

Example XVII

Nine parts benzalaniline are warmed with 6.9 parts diethyl phosphite. Reaction occurs after a minute and the solution becomes hot. On cooling it gets to a solid mass. It is crystallized from ethyl alcohol, melting point 92° C. The yield is quantitative.

Example XVIII

Thirteen and five-tenths parts furfurylidene-ethylimine are warmed with 13.8 parts diethyl phosphite at 80° C. until reaction begins. After 15 minutes the product is distilled, yielding 21 parts (81%) alpha-ethylamino-alpha - furylmethylphosphonic acid diethyl ester boiling at 127-128° C. at 0.75 mm. pressure. It is soluble in water to give a strongly alkaline solution.

Example XIX

Six and two-hundredths parts butylidenem-ethylimine are mixed with 13.58 parts dibutyl phosphite. The mixture is warmed at 70° C. for 15 minutes and then distilled, yielding 12 parts (61%) alpha-methylamino butyl phosphonic acid dibutyl ester boiling at 118-122° C. at 2 mm. pressure with a slight decomposition.

The compounds of the invention are generally useful as antioxidants and metal deactivators for the treatment of gasoline and petroleum products, edible oils and fats, and photographic solutions; as pour-point depressants; as modifying agents in extreme pressure lubricants; as plasticizers for resins and polymeric materials; as plating assistants in electroplating baths; as surface-active agents; as photographic developers; as fungicides, bactericides and insecticides; as new perfume constituents; as paper and textile treating agents; and as mothproofing and waterproofing agents. The compounds may be used as such or as salts with organic or inorganic acids. They may be reacted with organic halides or sulfates to form ternaryamines and quaternary salts. Treatment of the mono-N-substituted compounds with cyanic acid gives substituted ureas; with chloroformic esters substituted urethanes result. Those esters which contain an aromatic ring may be sulfonated, halogenated, nitrated, coupled with diazonium salts to produce new dyes, and the like.

I claim:

1. A process which comprises reacting a phosphite diester with a reactant selected from the group consisting of (1) a carbonyl compound and an amine having at least one unsubstituted amino hydrogen, (2) an alkylolamine, (3) an alkylideneimine and (4) a tetra-N-substituted alkylidenediamine, and recovering the aminomethylphosphonic acid diesters thereby produced.

2. A process which comprises reacting a phosphite diester with a carbonyl compound and an amine having at least one unsubstituted amino hydrogen, and recovering the aminomethylphosphonic acid diesters thereby produced.

3. A process which comprises reacting a phosphite diester with an aldehyde and an amine having at least one unsubstituted amino hydrogen, and recovering the aminomethylphosphonic acid diesters thereby produced.

4. A process which comprises reacting a phosphite diester with a ketone and an amine having at least one unsubstituted amino hydrogen, and recovering the amino-methylphosphonic acid diesters thereby produced.

5. A process which comprises reacting a phosphite diester with an aldehyde and an alkylamine having at least one unsubstituted amino hydrogen, and recovering the aminomethylphosphonic acid diesters thereby produced.

6. A process which comprises reacting a phosphite diester with an aldehyde and a dialkylamine, and recovering the aminomethylphosphonic acid diesters thereby produced.

7. A process which comprises reacting a phosphite diester with an N-substituted alkylolamine, and recovering the aminomethylphosphonic acid diesters thereby produced.

8. A process which comprises reacting a phosphite diester with an N-substituted alkylideneimine, and recovering the aminomethylphosphonic acid diesters thereby produced.

9. A process which comprises reacting a phosphite diester with a tetra-N-substituted alkylidenediamine, and recovering the aminomethylphosphonic acid diesters thereby produced.

ELLIS KIRBY FIELDS.

References Cited in the file of this patent

UNITED STATES PATENTS

| Number | Name | Date |
|---|---|---|
| 2,304,156 | Engelmann et al. | Dec. 8, 1942 |
| 2,328,358 | Pikl | Aug. 31, 1943 |
| 2,492,994 | Harman et al. | Jan. 3, 1950 |
| 2,579,810 | Fields | Dec. 25, 1951 |

OTHER REFERENCES

Kosolapoff, J. Am. Chem. Soc., vol. 69, pp. 2112-2113 (1947).

Chavane, Compte Rendus, vol. 224, pp. 406-408 (1947).